(12) United States Patent
Jones et al.

(10) Patent No.: US 6,893,194 B2
(45) Date of Patent: May 17, 2005

(54) WORKMAN'S TOOL FOR ACCESSING CAVITIES

(75) Inventors: Leslie Jones, Merseyside, WA (US); Derek Montieth Shore, Southport, PR (US)

(73) Assignee: Cavity Access, Ltd. (GB)

( * ) Notice: Subject to any disclaimer, the term of this patent is extended or adjusted under 35 U.S.C. 154(b) by 46 days.

(21) Appl. No.: 10/050,825

(22) Filed: Jan. 18, 2002

(65) Prior Publication Data

US 2002/0094246 A1 Jul. 18, 2002

(51) Int. Cl.[7] .............................................. B23B 51/04
(52) U.S. Cl. ..................... 408/204; 408/1 R; 408/206
(58) Field of Search ........................ 408/204, 206, 408/202, 703, 207, 209, 223, 224, 225, 1 R; 52/514

(56) References Cited

U.S. PATENT DOCUMENTS

| 3,672,785 A | * | 6/1972 | Byrne | 408/206 |
| 4,121,337 A | * | 10/1978 | Parker | 30/172 |
| 4,311,656 A | * | 1/1982 | Spriggs | 264/36.2 |
| 4,358,495 A | * | 11/1982 | Parker | 428/64.1 |
| 5,353,568 A | * | 10/1994 | Silva | 52/514 |
| 5,878,639 A | * | 3/1999 | Martinez | 83/13 |
| 6,247,283 B1 | * | 6/2001 | Slabaugh et al. | 52/514 |

FOREIGN PATENT DOCUMENTS

| DE | 2410120 A1 | * | 9/1975 | 408/206 |
| DE | 3214209 | * | 10/1983 | 408/206 |
| DE | 3423522 | * | 1/1986 | 408/206 |
| EP | 000458047 A | * | 11/1991 | 408/204 |
| GB | 1501198 | * | 2/1978 | 408/206 |
| JP | 52-14287 | * | 2/1977 | 408/206 |
| JP | 0010415 A | * | 1/1983 | 408/206 |

* cited by examiner

*Primary Examiner*—Daniel W. Howell
(74) *Attorney, Agent, or Firm*—Venable LLP; Andrew C. Aitken

(57) ABSTRACT

A tool assembly comprising a cylindrical hole saw having an annular cutting surface and at least one rebate blade positioned adjacent to the exterior sidewall of the hole saw having a cutting surface in a plane approximately parallel with the cutting surface of the hole saw and the rebate blade located a predetermined distance below the cutting surface of the cylindrical hole saw.

14 Claims, 4 Drawing Sheets

WORKMAN'S TOOL FOR ACCESSING CAVITIES

BACKGROUND OF THE INVENTION

The present invention is directed to a tool used for opening hollow core walls and ceilings to thereby allow access to the interior space of the wall or ceiling. The device includes a replaceable conventional pilot drill bit, a replaceable circular hole-cutting blade, (frequently referred to as a "hole saw,") a flange member and a series of rebate blades located at angular positions on the flange.

A common manner for the construction interior walls in homes and office buildings is the attachment of gypsum board, also referred to as drywall and sheet rock, to structural members including studs, trusses and joists. Gypsum board is attached to upright studs to form walls and on the bottom of joists or trusses to form ceilings. These structural members are spaced at regular intervals and thereby this construction creates spaces between structural members. For example, in typical construction in the United States studs used in walls are spaced at 16 inch intervals. When the framing stage of construction is complete, mechanical contractors, including plumbers, electricians, phone service technicians, and heating and air condition workers may install lines and equipment within the walls. These lines may include phone lines, cable television lines,gas lines, water and sewer conduits, vacuum lines for central vacuum and heating and air conditioning ducts and control lines. When the mechanical contractors have completed the installation, insulation is installed in the exterior walls and top floor ceiling areas. Next gypsum boards are attached to the exposed studs and joists using glue, nails and/or screws. After the gypsum boards have been installed, the surface is finished using tape and joint compound. Finishing the gypsum board results in a smooth, continuous and seamless surface.

Frequently, after the finishing work as described above has been completed, there is a need to install additional components within the finished walls. A homeowner or tenant may also have a need to access internal lines to make repairs. For example, it may be desirable to add insulation to walls that border the exterior of a completed structure. In order to introduce insulation to these spaces, holes must be temporarily created within each cavity between the structural members. In any event, the installation of new components within the walls and ceilings, or accessing existing components within the walls or ceiling requires cutting open the gypsum board to provide such access. Upon the completing of the job, the access hole must then be patched and the surface refinished. One conventional manner in which to patch holes requires cutting the access hole so that two adjacent structural members are revealed. Next a piece of drywall is cut to closely conform to the opening and attached to the adjacent structural members. One disadvantage with this technique is that it is difficult to apply the joint compound over and within the seam between the abutting edges without creating a bulge around the patch. While the bulge can be slowly tapered out to make the repair almost imperceptible, this procedure involves additional finishing work, and may require multiple applications of the joint compound. This technique also requires the creation of fairly large access opening. An alternative repair technique taking a short piece of lumber and inserting the lumber through the access hole and then, attaching the lumber on the interior surface on opposite sides of the opening with a drywall screw so that the lumber spans the hole. A patch is then cut and attached to the lumber. This technique allows a smaller hole to be created but still requires cutting a patch to closely conform to the hole and the problem of finishing the surface without a bulge is not avoided.

Another problem with cutting though these surfaces with conventional power tools is that the technician runs a risk of inadvertently cutting into the lines. The accidental rupture of a power line or water line can leave considerable remedial work to reinstate the walls or flooring.

Although there a number of approaches to the problem of accessing interior spaces, including those not described in detail herein, there is a need for alternative and improved manners in which to access and patch hollow core structure. Preferably this access and subsequent patch and replacement procedure can be performed with a minimal amount of time, effort and expense.

SUMMARY OF THE INVENTION

The present invention is directed a tool and method of repair that allows the rapid access to hollow core walls and ceilings in manner that enable the hole to be quickly formed and then repaired. According to the invention, a hole saw designed for use on a drill is provided with a rear flange attachment on which is provide a series of rebate blades. The hole saw is rotated upon engagement with a substrate creates a hole through the substrate in a conventional manner. Continued axial movement of the device in the direction of the substrate causes the rotating rebate blades located outside the hole saw to then come into contact with the surface of the substrate. The rebate blades engage the surface, penetrate the substrate, and remove a portion of the substrate to form an annular cavity outside a though-hole that is formed by the hole saw. Further axial movement towards the substrate causes a flange to engage the surface of the substrate and prevents further axial movement. The device is then removed from the wall and a hole having an annular cavity around the periphery of a through-hole is the resulting structure. The technician is then free to access the interior space and later provide a patch that can be seated in the annular cavity.

Figure 1:
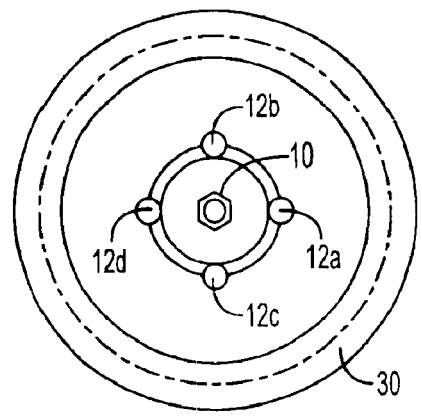
FIG. 1 is a top view in elevation of the flange portion of the invention.
Figure 2:
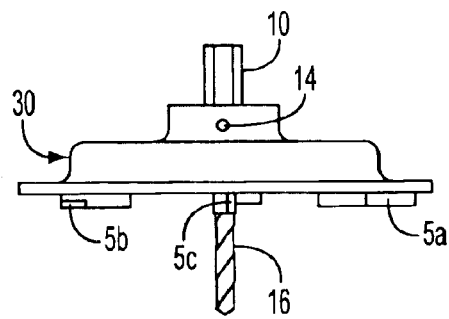
FIG. 2 is a side view in elevation of the flange part of the invention also showing the pilot drill bit.
Figure 3:
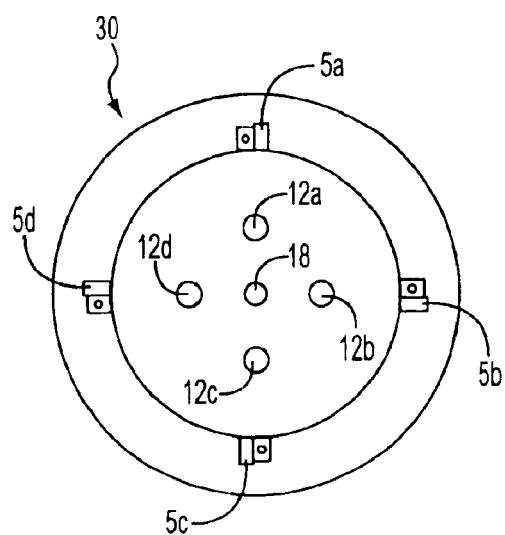
FIG. 3 is a bottom view in elevation of the flange part used in connection with the device according to the invention.

Now referring to FIG. 1 a top view of the flange portion of the invention is depicted. A the center of the flange part 30 is hexagonal shank 10 that is comprised of metal and is designed to be received on the head of a conventional drill. The drill, which may be either powered or manual, rotates the entire assembly including the flange member hold saw via the shank. Four through-holes 12a–12d are provided to received fasteners, such as screws, that engage and attach the hole saw through opposite holes 101a–101d that are provided through the rear end wall surface 22 of the hole saw 18. Flange member 30 is domed shaped and serves to stop the device from penetrating the wall and prevents dust and debris from flying back into the vision of the user of the tool. FIG. 2, a side view of the flange assembly, further shows an axial passage 14 that receives a thumbscrew. The thumbscrew, not shown, engages pilot drill bit 16 that is received in a central cylindrical sleeve 18. Pilot bit 16 is the first part of the device that engages the surface into which a hole is to be formed using the device according to the invention and provides stability to the assembly when the blades of the hole saw engage the surface. A seen in FIG. 3, the bottom of flange member has four rebate blades 5a–5d attach thereon. Center sleeve 18 that received the drill bit is also depicted.

Figure 4:
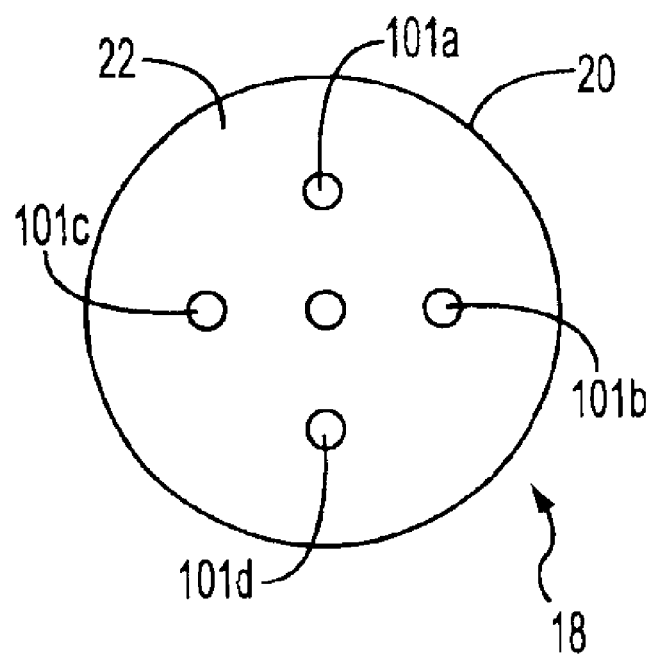
FIG. 4 is a top view in elevation of the hole saw used in connection with the present invention.
Figure 5:
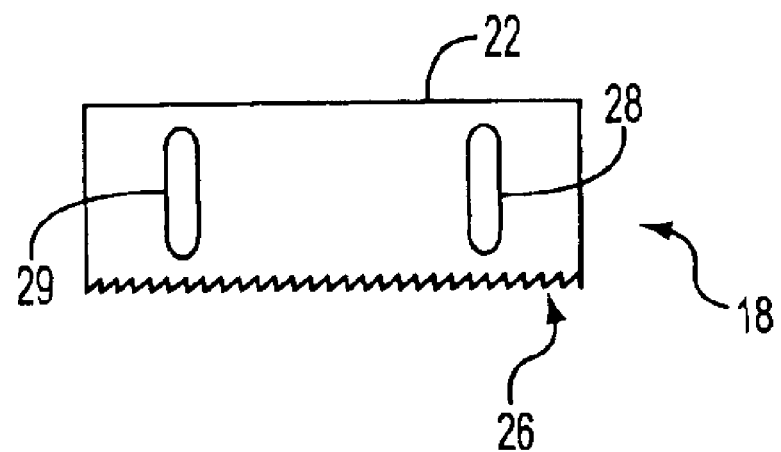
FIG. 5 is a side view in elevation of a hole saw used in connection with the invention.

The cylindrical hole saw 18 according to the invention is depicted in FIGS. 4 and 5. FIG. 4 shows a top elevational view of hole saw 18 having sidewall 20 and endwall 22. Provided through endwall 22 are through holes 101a–101d that are used for the attachment of the hole saw 18 to the flange member 30 by an appropriate affixing means including screws or bolts and nuts. At the center of hole saw 18 is an opening or sleeve 24 through which the pilot drill bit is received. As seen in FIG. 5, hole saw 18 has a cutting surface 26 that is designed to engage and cut into the surface of a substrate. Lateral holes 28 and 29 are provided through the sidewall 20 in order to enable a user to remove a circular plug that is cut by the hole saw from the interior potion of the of the cylinder.

Figure 6A:
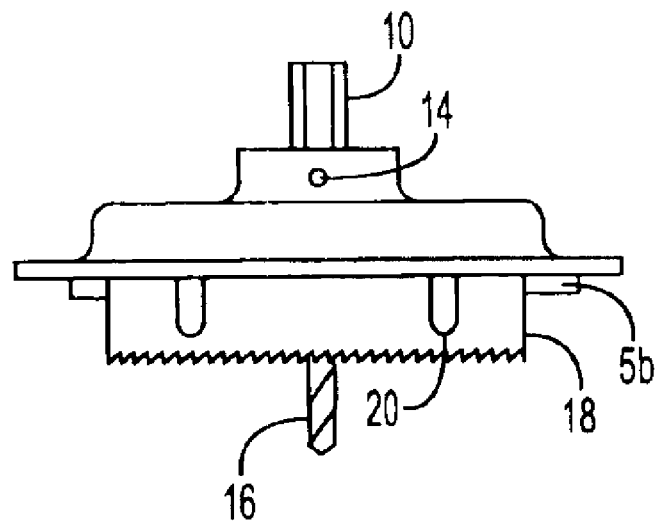
FIG. 6 is a side view in elevation of the assembly of the device according to the invention that includes the flange, the hole saw and drill bit.
Figure 6B:
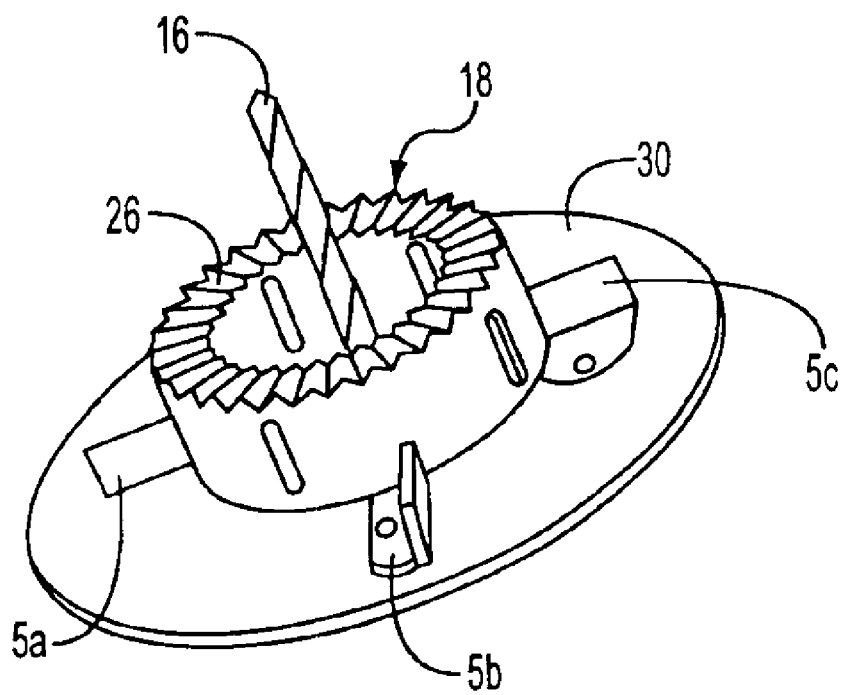

FIG. 6a depicts the assembly of the components including the flange member 30, hole saw 18 and pilot drill bit 16. As best seen in FIG. 6b, the four rebate blades 5a–5d are axially positioned on bottom side of the flange member 30 near the edge of the flanges and adjacent to hole saw 18. In the embodiment depicted in FIG. 6b the rebates blades are shown to have an "L shaped" profile wherein one surface is parallel with and is affixed to the bottom surface of flange member 30 and the other surface of the blade extends in an axial direction. The end of the rebate blade that extends in the axial direction is designed to engage the surface of the substrate. While in the specific embodiment depicted herein the rebate blades are affixed to the bottom surface of the flange 30, in an alternative embodiment of the invention the rebate blades may be attached to the outside of the hole saw. In yet a further contemplated embodiment the rebate blade consists of a second cylindrical hole saw directly adjacent, outside of, and concentric with an inner hole saw. The rebate blade or blades are formed of metal and are designed to cut into or abrade the surface of the substrate that is to be accessed and to create an annular cavity around the circumference of the through hole. The through hole is conventionally formed by the hole saw.

Figure 7:
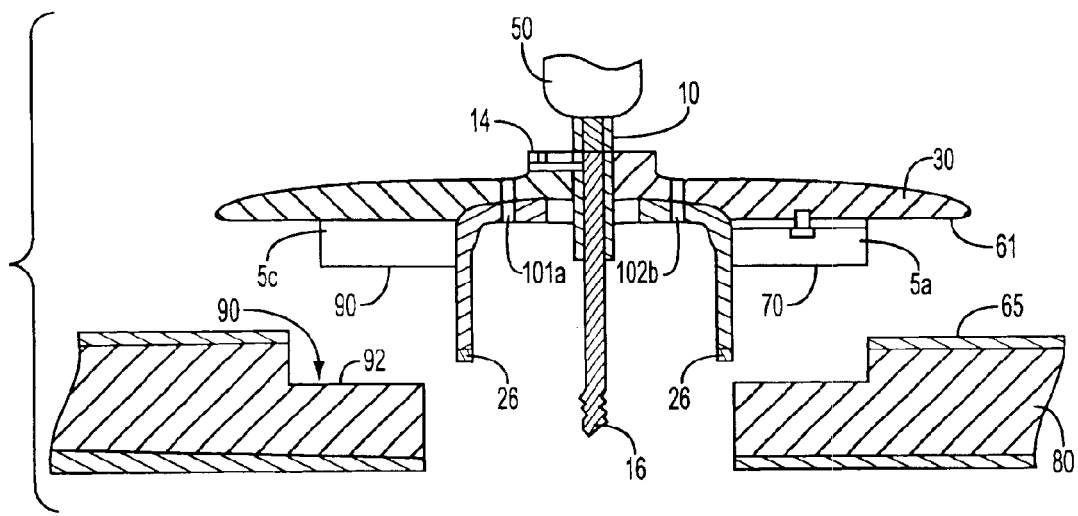
FIG. 7 is a side sectional view of the invention next to a hole that is formed through a substrate using the device according to the invention.

FIG. 7 depicts a sectional view of the invention directly above a hole that is formed by the tool wherein the shank 10 is engaged by drill head 50. In preferred embodiments, the axial length of the side wall of the circular hole saw from the flange members cutting surface is selected to be approximately the same as the thickness of the substrate to be accessed. By selecting a hole saw having a sidewall with an axial length that is approximately the same as the thickness of the substrate, the risk of accidentally cutting into materials or lines contained within the wall or ceiling is significantly reduced. In operation, the pilot drill bit 16 first engages the surface of the substrate and penetrates the material. The pilot drill bit helps align the tool and maintains stability of the tool when the hole saw engages the surface of a substrate. Next the cutting surface 26 of the hole saw engages the surface 65 of the substrate 80 and begins to abrade the surface in an annular ring. Continuing axial movement of the assembly causes the cutting surfaces 70 of the rebate blades 5a–5b to engage the surface of the substrate at a location just outside the engagement areas of the hole saw. The rebate blades 5a–5d, like the cutting surface 26 of the cylindrical hole saw 18, penetrate the surface 65 and abrades the material away. As the assembly continues to move in an axial direction, surface 61 of flange 30 engages the top surface 80 of substrate 80. The engagement of the flange to the top surface of the substrate prevents further axial movement of the assembly.

Figure 8:
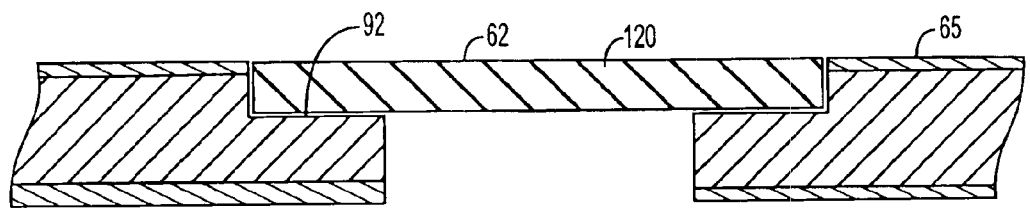
FIG. 8 is a side sectional view of a patch received in a hole in a substrate that was formed by the device according to the invention.
Figure 9:
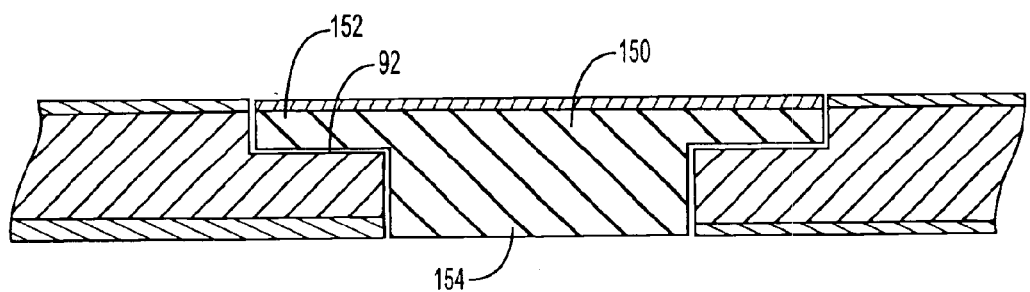
FIG. 9 is a side sectional view of an alternative patch received in a hole in a substrate formed by the device according to the invention.

To repair the hole made by the device, a complementary disk shaped patch 120 is provided that closely conforms to the dimension of the hole. Referring now to FIG. 8 patch 120 may be made of a thin fiber board having an axial dimension that closely conforms to the annular cavity 90 or, as shown in FIG. 9, may have a stepped axial dimension wherein an outer annular region 152 of the patch has a thin axial dimension that is received in the annular cavity 90 and a thicker central core region 154 that is received in the though hole that was created by the hole saw. In any event, the annular cavity serves to receive patch and secure it in place by providing a surface 92 wherein the patch may be seated. The patch is then is further secured using adhesive and/or conventional joint compound. As seen in FIGS. 8 and 9, the patch may have a thickness less than the distance from the cutting surface of the rebate blade to the flange member.

In a preferred embodiment the invention, the device creates a hole large enough for the technician to inset his or her hand inside the cavity. Once the work is completed a pre-manufactured hole cap or patch is affixed within the hole to reinstate the floor, ceiling or wall. In addition to gypsum or plaster board as described above, it is further contemplated that the invention may also be used to used to cut into chipboard or plywood flooring or other wood surfaces as well as materials made of synthetic resin or fiber. A variety of complementary patches may be provided that can be made of any materials that are intended to be engaged by the tool. Indeed, almost any surface may be penetrated by the device, including stone and tile, if the appropriate hole saw and rebate blades are used. In each of the contemplated uses, a patch can then be set in the hole that results from use of the tool.

It should be further appreciated that flange member does not have to rotate in order to practice the invention. For example the blade may be affixed to rotating hole saw rather than the flange. In such an alternative embodiment the flange may still serve as protective shield and as a manner in which to control the depth of penetration of the tool. In yet a further embodiment, a single hole saw having two concentric cutting surfaces may be used, with a flange portion, behind the second outer surface to serve as a stop.

Once again referring to FIG. 7, a first embodiment of a patch that can be used with the invention is merely a disk that can be inserted to the top portion of the hole created by the tool. In this embodiment, the patch is seated in the annual cavity created by the rebate blades and spans the hole created by the hole saw. The top surface 62 of the patch is within the same plane as the exterior surface 65 of the gypsum board. FIG. 9 shows an alternative patch having two axial dimensions. The outer edge region 152 has a dimension that approximates the depth of the annular cavity formed by the rebate blade and the central core region 154 extends into the through hole that was formed by the tool. The patch depicted in FIG. 7 has a dimension at the center core that is the same as the substrate. This alternative patch may be used in situations where both sides of the maybe finished and further, and gives additional structural strength to the wall.

It should be appreciated that the dimensions of the hole saw, including the axial length and circumference, as well as the distance between cutting surface of the rebate blades and the cutting surface of the hole saw may be altered depending on the intended application. The axial dimensions of the sidewall of the hole saw from the flange to the cutting surface may be altered depending on the thickness of the substrate that is to be penetrated. It should also be appreciated that while the specific embodiment depicted herein shows four rebates blades, that any number of rebate blades could be used to achieve the objects of the invention. One should also recognize that although a circular flange is depicted to stop the forward movement of the device, other mechanism could be advantageously employed to ensure that the rebate blades penetrate a predetermined distance. For example, the blade itself could be provided with a flange extension that would allow a predetermined axial penetration.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

We claim:

1. A combination of a patch and a tool for accessing hollow members comprising a patch and a tool assembly, said tool assembly further comprising a cylindrical hole saw having a cutting surface and at least one rebate blade, said rebate blade positioned adjacent to the exterior sidewall of said hole saw and said rebate blade having a cutting surface in a plane approximately parallel with the cutting surface of said hole saw and said rebate blade located a predetermined distance below said cutting surface of said cylindrical hole saw, said rebate blade further comprising an "L shaped" member, said "L shape" further comprising a cutting section having a cutting surface thereon and a base member section wherein said base member is attached to said tool assembly at angular positions with respect to said hole saw and further comprising a flange member, said flange member located on said hole saw on an end opposite said cutting surface and opposite the cutting surface of said rebate blades and said flange member extending a distance in a perpendicular direction from a central axis that is further than a distance said rebate blades extend from said central axis, wherein when said flange member engages a surface of a hollow member, further axial movement into said member is prevented and said rebate blades create an annular ledge in the surface of said member, and a circular-shaped patch, said patch having a thickness less than the distance from the cutting surface of said rebate blade to said flange member and a radius a distance less than the distance from a central axis of said hole saw and the outermost part of said rebate cutting surface, wherein said circular patch can seat on said annular ledge.

2. A tool assembly comprising a cylindrical hole saw having an annular cutting surface and at least one rebate blade, said rebate blade positioned adjacent to the exterior sidewall of said hole saw and said rebate blade having a cutting surface in a plane approximately parallel with the cutting surface of said hole saw and said rebate blade located a predetermined distance below said cutting surface of said cylindrical hole saw, said rebate blade further comprising an "L shaped" member, said "L shape" further comprising a cutting section having a cutting surface thereon and a base member section wherein said base member is attached to said tool assembly at angular positions with respect to said hole saw and further comprising a flange member, said flange member located on said hole saw on an end opposite said cutting surface and said flange member having a diameter larger than the diameter of said rebate blades, wherein when said flange member engages the surface, further axial movement into the cutting surface is prevented.

3. The tool and patch combination recited in claim 1 wherein said rebate blade is attached to said flange member.

4. The tool and patch combination as recited in claim 3 wherein said flange member receives a plurality of rebate blades.

5. The tool and patch combination as recited in claim 4 wherein said rebate blades are located at angular positions around said flange member.

6. The tool and patch combination as recited in claim 1 further comprising a pilot drill bit, wherein said drill bit is received in a sleeve in the center of said cylindrical hole saw.

7. The tool and patch combination recited in claim 1 further comprising a shank, said shank adapted for reception in the head or chuck of a drill.

8. The tool recited in claim 2 wherein said cylindrical hole saw has an axial dimension from the flange member to the cutting surface approximately equal to the thickness of the material to be cut.

9. A method of accessing an interior space behind a substrate using the combination of the patch and tool assembly recited in claim 1 comprising the steps of forming an access opening in a surface of a substrate, said access opening having an annular through passage and an annular cavity around the exterior of said passage, accessing said interior space, and next inserting said patch in said through passage, said patch received and seated in said annular cavity.

10. An access and repair kit comprising the tool assembly recited in claim 1 and a plurality of patches, said patches having a radial dimension approximately the same as the distance from the center of the cylindrical hole saw to the cutting surface of said rebate blade that is the most distant from said hole saw center, and said patches having a uniform axial dimension approximately equal to the distance that said rebate blade extends in an axial dimension from said flange member.

11. The tool and patch combination as recited in claim 1 wherein said rebate blades are detachable and replaceable from said hole saw component of the assembly.

12. The tool and patch combination as recited in claim 1 wherein said cylindrical hole saw is detachable and replaceable from said rebate blade component of the tool.

13. The tool and patch combination as recited in claim 4 wherein said pilot drill bit is detachable and replaceable from the rebate blade component of the tool.

14. The tool recited in claim 2 wherein said flange member does not rotate with the cutting members.

* * * * *